F. C. WHEELER.
DEVICE FOR AUTOMATICALLY CUTTING FINISHED TELESCOPIC GRAIN CONDUCTOR TUBES.
APPLICATION FILED JULY 12, 1909.
965,781.
Patented July 26, 1910.
4 SHEETS—SHEET 1.
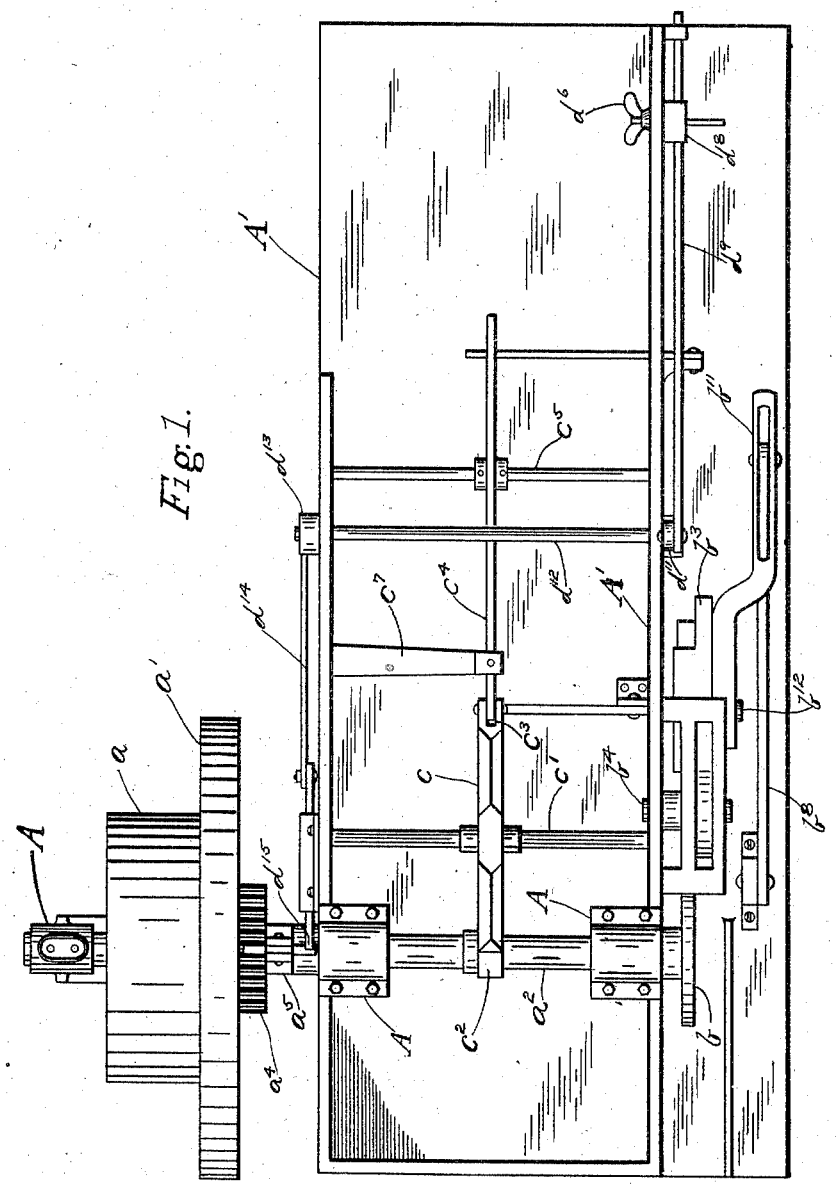

F. C. WHEELER.
DEVICE FOR AUTOMATICALLY CUTTING FINISHED TELESCOPIC GRAIN CONDUCTOR TUBES.
APPLICATION FILED JULY 12, 1909.
965,781.
Patented July 26, 1910.
4 SHEETS—SHEET 2.
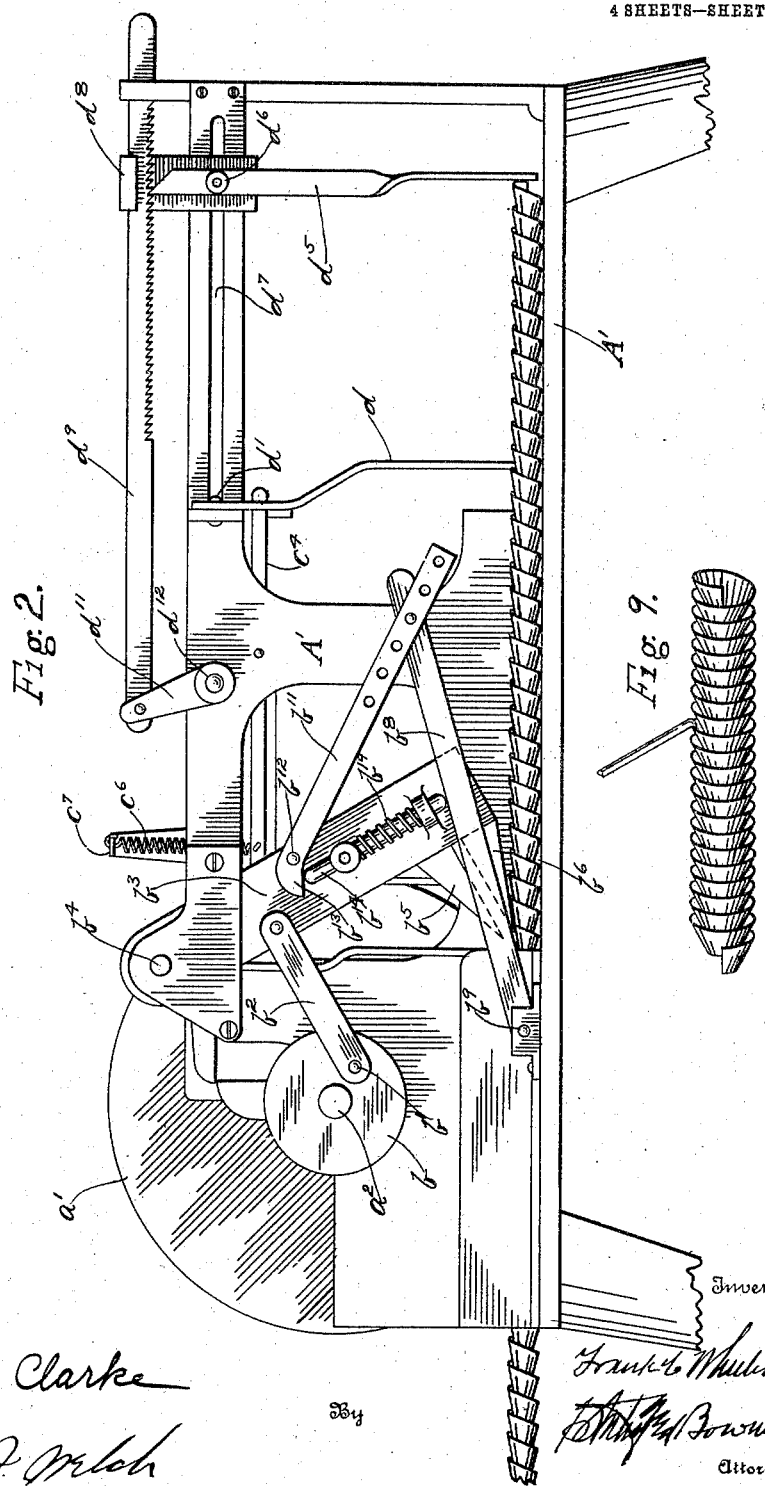

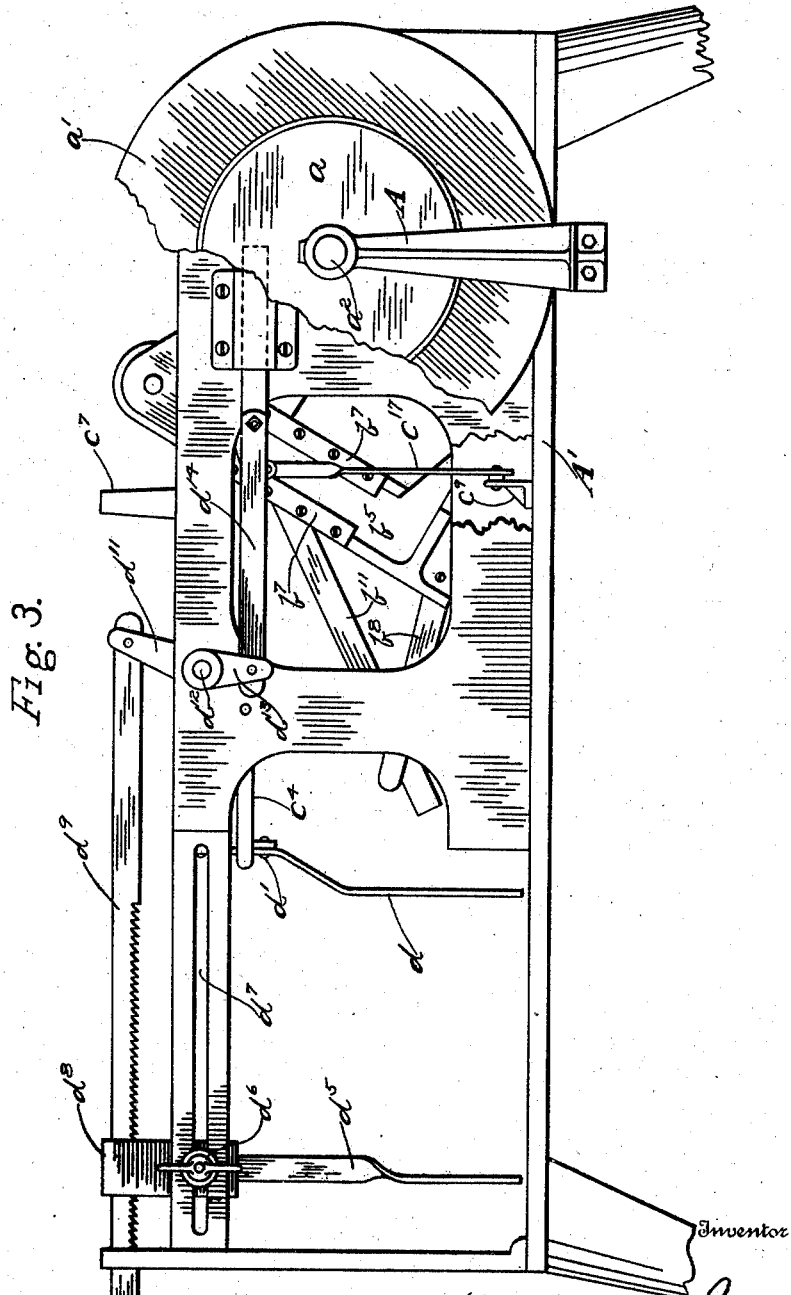

F. C. WHEELER.
DEVICE FOR AUTOMATICALLY CUTTING FINISHED TELESCOPIC GRAIN CONDUCTOR TUBES.
APPLICATION FILED JULY 12, 1909.
965,781.
Patented July 26, 1910.
4 SHEETS—SHEET 4.
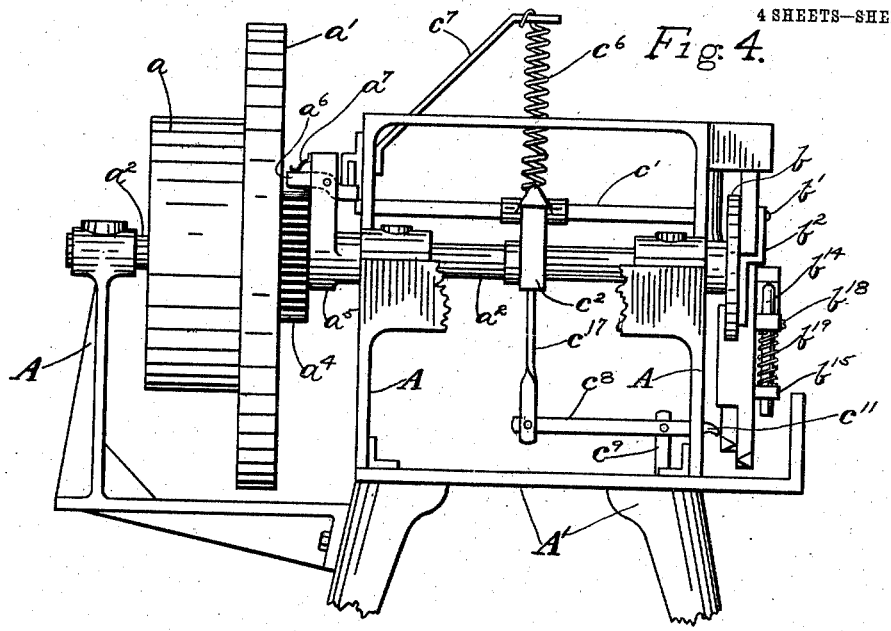
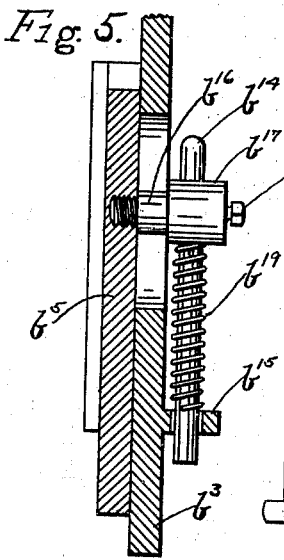
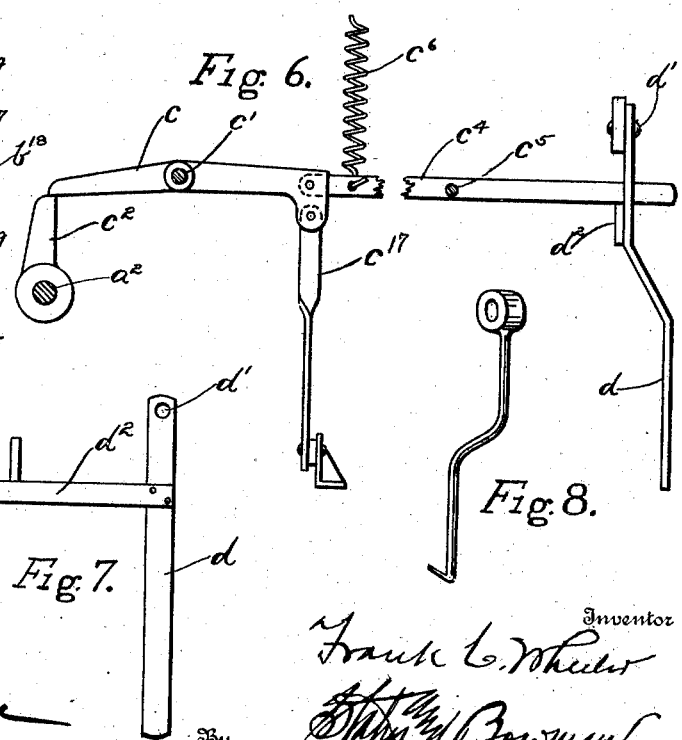

UNITED STATES PATENT OFFICE.

FRANK C. WHEELER, OF SPRINGFIELD, OHIO, ASSIGNOR TO THE AMERICAN SEEDING MACHINE COMPANY, OF SPRINGFIELD, OHIO, A CORPORATION OF OHIO.

DEVICE FOR AUTOMATICALLY CUTTING FINISHED TELESCOPIC GRAIN-CONDUCTOR TUBES.

965,781.   Specification of Letters Patent.   Patented July 26, 1910.

Application filed July 12, 1909. Serial No. 507,203.

*To all whom it may concern:*

Be it known that I, FRANK C. WHEELER, a citizen of the United States, residing at Springfield, in the county of Clark and State of Ohio, have invented certain new and useful Improvements in Devices for Automatically Cutting Finished Telescopic Grain-Conductor Tubes, of which the following is a specification.

This invention relates to an improved machine for cutting in predetermined lengths a finished telescopic ribbon grain conductor tube.

In a former application, Ser. No. 487,912, there is fully shown the mechanism for automatically coiling the telescopic ribbon conductor tube and the present machine relates to means for cutting same after an endless tube has been formed by the mechanism described in said application.

The mode of operation, in a general way, is to so arrange the endless tube that it will rest upon the base of the machine and when the proper predetermined length has been formed, cutting devices will then operate to seize one of the whirls of the tube. In order to effect this cutting operation it is desirable to move the cutting devices downwardly and at an inclination, so that the points of the cutters may enter within the tube itself and seize one of the whirls while at another point a hold coöperates to prevent the flexible coil tube from buckling out of proper position and, in order to effect in the most satisfactory manner the cutting operation, a hook-shaped device is adapted at another point to hold one of the whirls while it is passing along the base of the tube. In this connection it is to be understood that some feeding device is preferably employed, such as shown in the machine of the former application, adapted to lie in close proximity to the machine shown herein, so that the endless tube will be fed along the base of the machine by the feed rollers, described therein, and the hook-shaped device, engaging one of the whirls of the tube, will insure the whirls being held against elongation during the cutting operation and yet the coiled tube may be fed along with a screw-like operation, the whirls turning on the hook.

Referring to the drawings, Figure 1 is a plan view of the machine. Fig. 2 is a side elevation. Fig. 3 is a side elevation from the side opposite that shown in Fig. 2, to-wit: the left side of the machine looking from the rear of the fly-wheel as shown in Fig. 1. Fig. 4 is a rear view. Fig. 5 is a detail view of the cutting device. Figs. 6, 7 and 8 are details of the holding, kick-off and hook devices. Fig. 9 is a view of the conductor tube.

Like characters of reference indicate like parts in the several views.

*Main operating devices.*—Referring to Fig. 1, the pulley, $a$, is so arranged that any suitable power may be applied to it and a flywheel, $a^1$, is preferably formed integral therewith so that during the operation of the machine there is a continuously revolving pulley and flywheel, $a$ and $a^1$, which rotates loosely on the shaft, $a^2$, supported from hangers, A, which project upwardly from the base of the machine, $A^1$. There is preferably formed integral with the flywheel a ratchet wheel, $a^4$, which is a continuously revolving member and coöperates with an intermittently operated member to give the driven shaft an intermittent movement at predetermined times to effect different operations necessary for the desired result. This intermittent operation is effected by means of a member, $a^5$, which is splined or keyed to the shaft, $a^2$, and at its upper end carries a pivoted pawl, $a^6$, which is spring-pressed by a spring, $a^7$, and normally adapted to engage the teeth of the ratchet wheel, $a^4$. This pawl is held against operation by a sliding bar and is released by said bar at predetermined times to permit the spring, $a^7$, to force the pawl, $a^6$, into engagement with the ratchet teeth, thereby effecting a connection between the continuously revolving member, $a^4$, and member, $a^5$.

*Connections for driven shaft.*—The driven shaft, $a^2$, is so arranged that during a complete revolution thereof the cutting device, and likewise the movable holding device, will be operated and thereafter the kick-off device. There is rigidly journaled on one end of the shaft the crank disk, $b$, (see Fig. 2) so that whenever the intermittently operated member, $a^5$, is connected with the continuously revolving member, $a^4$, the crank disk will be driven through its connections with the driven shaft, $a^2$. An ordinary wrist pin, $b^1$, is shown on the crank disk and a connecting rod, $b^2$, is pivotally mounted on the wrist pin and connects with the swinging frame, $b^3$. This frame swings from the pivot, $b^4$, which is supported on the main frame, $A^1$, of the machine, and the swinging frame, $b^3$, supports the cutting blades, $b^5$ and $b^6$.

*Cutting devices.*—The cutting blade, $b^5$, is the movable blade of the scissors-like cutting devices and, referring to Fig. 3, said blade is shown slidingly mounted in guides, $b^7$. The means for operating the cutting blade, $b^5$, (see Fig. 2) is illustrated by a form of toggle levers or arms so arranged that, when the crank disk causes the swinging frame, $b^3$, to operate, the movable blade, $b^5$, will be operated near the end of the forward swinging movement of the frame. One arm of the toggle device, $b^8$, is pivotally connected to the base of the frame at the point, $b^9$, and at its free end is hinged to the other toggle, $b^{11}$, which is pivotally connected at $b^{12}$ to the swinging frame and has a nose-shaped end, $b^{13}$, which is adapted to bear against a plunger, $b^{14}$. The plunger, $b^{14}$, (referring to Fig. 5) is adapted to move within a guide, $b^{15}$, formed on the swinging frame, $b^3$. The connection between the plunger, $b^{14}$, and the movable cutting blade, $b^5$, is by a screw-threaded bolt, $b^{16}$, which is rigidly secured, in the manner shown in Fig. 5, to the movable blade, $b^5$, and at its free end formed with a perforated head, $b^{17}$. The upper end of the plunger, $b^{14}$, projects through said head and a set screw, $b^{18}$, is adapted to form a rigid connection between the plunger, $b^{14}$, and a movable blade, $b^5$, such that the blade, $b^5$, may be adjusted in its relation to the plunger. The spring, $b^{19}$, constitutes the means for retracting the movable blade, $b^5$, to normal position after the cutting has been effected. It is apparent from Fig. 2 that by reason of the levers, $b^8$ and $b^{11}$, arranged to operate somewhat in the nature of a toggle, the nose-shaped device, $b^{13}$, will press the plunger, $b^{14}$, downwardly after the swinging frame, $b^{13}$, swings from normal position and thereby the cutting will be quickly effected as the ends of the blades, $b^5$ and $b^6$, enter between two whirls of the conductor tube, and it is apparent likewise that the frame, $b^3$, has a very limited swinging movement, being positively thrown to one position and likewise retracted by positive means, and the connections between the blade and operating devices are such that the cutting is quickly effected so soon as the frame swings to proper position to permit the blades to seize one of the whirls of the tube.

*Kick-off and holding devices.*—The connection for the kick-off and holding device is by means of a frame, shown and illustrated in Fig. 6. The bar, $c$, is pivotally mounted on the shaft, $c^1$, (see Fig. 1) which is rigidly journaled in the frame of the machine projecting across the frame parallel with the driven shaft, $a^2$, the end of the bar projects normally above the lug, $c^2$, which is rigidly mounted on the shaft, $a^2$, such that, when the driven shaft, $a^2$, begins its revolution, the stop or lug, $c^2$, is withdrawn from the end of the bar, $c$, and, in that way, the bar is permitted to operate at predetermined times. The bar, $c$, at the end opposite from that which bears against the lug, $c^2$, is formed with a socket, $c^3$, and within the socket there is secured the end of the bar, $c^4$, which is mounted on the shaft, $c^5$. The spring, $c^6$, at its lower end is secured to one end of the bar, $c^4$, and near the point of connection with the bar, $c$, the upper end of the spring being secured to a lug, $c^7$, which projects from the stationary part of the machine. When the piece, $c^2$, is withdrawn from the end of the bar, $c$, the spring, $c^6$, by reason of its tension, will cause the two ends of the bars, $c$ and $c^4$, to move upwardly while the rear end of the bar, $c^4$, will move downwardly. The movement of the bar, $c$, effects the operating of the holding device, while the bar, $c^4$, is so connected with the kick-off device as to cause the operation of the kick-off. An arm, $c^{17}$, projects downwardly from the bar, $c$, being pivotally mounted in the socket end thereof, and the free end of said arm, $c^{17}$, is connected to the bar, $c^8$, (see Fig. 4) pivotally mounted on a piece, $c^9$, which in turn projects from the base of the machine. The free end, $c^{11}$, projects within the path of movement of the telescopic tube, such that when the arm, $c^7$, is pulled upwardly by the spring, $c^6$, after the arm, $c$, is released by the stop, $c^2$, the free end, $c^{11}$, is pressed downwardly and holds the ribbon conductor tube against buckling. Simultaneously, the cutting devices are operated, as heretofore explained, to cut one of the whirls of the tube so as to form a conductor tube of predetermined length. Immediately upon the cutting of the tube, the kick-off is operated to throw the tube from the base of the machine so as to permit the endless ribbon tube to continue its feeding motion free from any interference thereof. The kick-off is indicated by $d$, (see Figs. 6 and 7) and is pivoted at the point $d^1$, and the bar, $c^4$, rests upon the arm, $d^2$, which projects from the kick-off, $d$. Consequently, when the spring, $c^6$, operates to raise the end of the bar, $c^4$, to which it is attached, the free end of the bar, $c^4$, is depressed and, bearing against the projecting arm, $d^2$, from the kick-off, $d$, forces the kick-off to swing laterally and, as the end of the kick-off bears against the conductor tube, the tube is thereby pushed from the base of the machine.

The starting and stopping mechanism for the different operations is controlled by the stop, $d^5$, which projects downwardly, having its end in the path of movement of the endless tube. The stop, $d^5$, is adjustable by means of the thumb screw, $d^6$, and the slot, $d^7$. At its upper end the stop is formed with a plate, $d^8$, which is adapted to fit over a notched bar, $d^9$. One end of the notched bar is pivotally connected to a link, $d^{11}$, which is pivotally mounted on the shaft, $d^{12}$, which in turn is loosely journaled in the frame of the machine. The link, $d^{13}$, (see Fig. 3) projects from the shaft, $d^{12}$, at one side of the machine (see Fig. 1) and this link connects to a release bar, $d^{14}$, which normally has its ends, $d^{15}$, projecting above the pawl, $a^6$, and holding the pawl against tension of the spring, $c^6$, from engagement with the ratchet wheel, $a^4$. But when the end of the ribbon tube strikes the stop, $d^5$, the shaft, $d^{12}$, is oscillated to cause the sliding release bar, $d^{14}$, to be retracted so as to release the pawl, $a^6$, and permit the intermittently operated member, $a^5$, to become connected up with the continuously revolving member, $a^4$, so that the shaft, $a^2$, is given a complete revolution. But when the member, $a^5$, reaches its normal position, the pawl, $a^6$, again contacts with the release bar, $d^{14}$, so as to disconnect the member, $a^5$, from the ratchet wheel, $a^4$.

*General operation.*—In brief, the sequence of operation is as follows: The driven shaft, $a^2$, is started by means of the conductor tube throwing the stop, $d^5$, so as to release the pawl, $a^6$, and thereby connect the members, $a^4$ and $a^5$. The revolution of the shaft, $a^2$, causes the holding device, $c^{11}$, to bear against the top of the part of the endless tube to be cut at a point in proximity to the cutting devices. Thereupon, the cutting devices are operated to cut one whirl of the endless tube and immediately thereafter the kick-off device is operated to cause the tube, thus cut in proper length, to be thrown from the machine and the release bar is thereupon retracted to normal position so that the pawl, $a^6$, will immediately be disengaged from the ratchet wheel, $a^4$, and the driven shaft stopped until another predetermined length of tube has been fed along the base of the machine, when the bars will again operate, as described.

Having thus described my invention, I claim:

1. In a machine for cutting conductor tubes comprising whirls of metal ribbon, a main frame, with operating means supported thereby, intermediate mechanism connected to said operating means, cutting devices, and means connected to said intermediate mechanism for moving same to a position such that one of the said cutting devices will project between two whirls of said tube, and means so operated by said driven means for operating thereafter said cutting devices, substantially as specified.

2. In a machine for cutting conductor tubes comprising whirls of metal ribbon, a main frame, with operating means supported thereby, intermediate mechanism connected to said operating means, cutting devices, and means connected to said intermediate mechanism for moving same to a position such that one of the said cutting devices will project between two whirls of said tube, and means so operated by said driven mechanism for operating thereafter said cutting devices, a stop controlling the starting of said driven mechanism operated by the end of the conductor tube, substantially as specified.

3. In a machine for cutting conductor tubes comprising whirls of metal ribbon, the combination of main operating devices, a movable frame and cutting devices supported on said frame, means connected to said main operating device for moving said frame to a position such that one of the said cutting devices will project between two whirls of said tube, and means for operating thereafter said cutting devices, substantially as specified.

4. In a machine for cutting conductor tubes comprising whirls of flexible ribbon, the combination of main operating devices, a movable support, cutting devices on said support, means for moving said support to a position such that one of the said cutting devices will project between the two whirls of said tube, and means operated by said main operating device for operating thereafter said cutting devices, a movable stop, and means for operating said stop simultaneously with the cutting devices for holding the tube against buckling, substantially as specified.

In testimony whereof, I have hereunto set my hand this 10th day of July 1909.

FRANK C. WHEELER.

Witnesses:
 FRANK R. PACKHAM,
 CHAS. I. WELCH.